(12) United States Patent
Liao et al.

(10) Patent No.: US 9,030,125 B2
(45) Date of Patent: May 12, 2015

(54) POWER CIRCUIT HAVING MULTIPLE STAGES OF CHARGE PUMPS

(71) Applicant: Sitronix Technology Corp., Hsinchu County (TW)

(72) Inventors: Kuan-Chao Liao, Hsinchu County (TW); Kai-Yi Wu, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 52 days.

(21) Appl. No.: 14/047,148

(22) Filed: Oct. 7, 2013

(65) Prior Publication Data

US 2015/0048743 A1    Feb. 19, 2015

(30) Foreign Application Priority Data

Aug. 16, 2013    (TW) .............................. 102129408 A

(51) Int. Cl.
| | |
|---|---|
| H05B 37/00 | (2006.01) |
| H05B 37/02 | (2006.01) |
| H02M 3/04 | (2006.01) |
| G09G 3/36 | (2006.01) |

(52) U.S. Cl.
CPC .. *H02M 3/04* (2013.01); *G09G 3/36* (2013.01)

(58) Field of Classification Search
USPC .......... 315/161–166, 209 R, 223, 224, 227 R, 315/291, 307; 327/108, 111, 124, 538
See application file for complete search history.

(56) References Cited

U.S. PATENT DOCUMENTS

| | | | |
|---|---|---|---|
| 2008/0100233 A1* | 5/2008 | Negoi ............................ | 315/299 |
| 2008/0273007 A1* | 11/2008 | Ng et al. ....................... | 345/107 |

\* cited by examiner

*Primary Examiner* — Jimmy Vu
(74) *Attorney, Agent, or Firm* — Rosenberg, Klein & Lee

(57) ABSTRACT

The present invention discloses a power circuit having multiple stages of charge pumps. The power circuit comprises a first charge pump, a second charge pump, a voltage stabilizing capacitor, and an output capacitor. The first charge pump adjusts an input voltage and produces a first output voltage. The second charge pump adjusts the first output voltage, produces a second output voltage, and outputs the second output voltage for driving a loading. The voltage stabilizing capacitor is coupled between the first and second charge pumps and connected externally to the output of the first charge pump. The output capacitor is coupled to the second charge pump for providing the second output voltage. According to the present invention, the effect of supplying large transient currents to the loading can be achieved by connecting externally the voltage stabilizing capacitor to the output of the first charge pump.

11 Claims, 17 Drawing Sheets

POWER CIRCUIT HAVING MULTIPLE STAGES OF CHARGE PUMPS

FIELD OF THE INVENTION

The present invention relates generally to a power circuit, and particularly to a power circuit having multiple stages of charge pumps.

BACKGROUND OF THE INVENTION

Many current commercial electronic devices usually require different voltage levels as power sources. Thereby, charge pumps are disposed for using existing voltages to generate different voltage levels. For generating higher voltage levels, multiple stages of charge pumps are connected in series for attaining multiplying voltages. Nonetheless, given the limit by the efficiency of each stage of the charge pumps, the efficiency of multiplying voltages is insufficient, leading to inability of supplying large transient currents.

In addition, take applying power supplies to liquid-crystal displaying devices as an example. After liquid crystal materials are discovered in Europe, their utility is developed in the US. In Japan, their physical properties and application technologies in various fields are researched and new-generation liquid crystal display (LCDs) are developed continuously. At present, various liquid crystal technologies have been applied to displays extensively, particularly LCDs. Manufacturers have extended from the twisted-nematic LCD (TN LCD) to the super-twisted-nematic LCD (STN LCD), and further to the thin-film-transistor LCD (TFT LCD) with the trend of increasing scale. Accordingly, the research and development of the driving and power circuits of liquid-crystal displaying devices have become one of the key points for improving their resolution.

In general, the driving methods of liquid-crystal displaying devices can be divided into active and passive driving methods. No matter active or passive driving method, the scan electrode of the driving chip requires a high voltage. In order to simplify the external power circuit, a voltage boosting circuit is usually disposed in the power circuit of the displaying device. The voltage boosting circuit is normally composed of multiple stages of charge pumps connected in series for achieving the effect of providing high voltages.

In the past several years, display technologies have developed rapidly; the resolution of displays and the number of scan electrodes get higher increasingly. The part in a driving chip consuming more power is the transient when the scan electrode changes from the low voltage to the high voltage. According to the zero-capacitor architecture adopted by the voltage boosting circuit of the power supply of current displaying devices, higher voltage is given by multiplying the voltage directly. Given the limit imposed by the efficiency of each stage of charge pumps, the efficiency of multiplying voltages is insufficient, leading to inability of the voltage boosting circuits in supplying driving chips with large transient currents. When the loading requires a large transient current, the voltage boosting circuit cannot supply the required current. Besides, the output voltage of the voltage boosting circuit cannot be maintained within a stable range, resulting in incapability of meeting the requirement for high resolution. Hence, a novel architecture is required for driving the high-resolution driving chip using minimum number of capacitors.

Accordingly, the present invention provides a power circuit having multiple stages of charge pumps, which requires no floating capacitor for supplying large transient currents.

SUMMARY

An objective of the present invention is to provide a power circuit having multiple stages of charge pumps, which adds an external voltage stabilizing capacitor at the output of the charge pumps for supplying large transient currents to the loading.

Another objective of the present invention is to provide a power circuit having multiple stages of charge pumps, which uses at least a timing controller for improving the multiple or switching frequency of at least a charge pump in the voltage conversion time of the scan driving signal for reducing the power consumption of displaying devices and saving power.

Still another objective of the present invention is to provide a power circuit having multiple stages of charge pumps, which uses at least a timing controller for reducing the multiple or switching frequency of at least a charge pump in the voltage holding time of the scan driving signal for reducing the power consumption of displaying devices and saving power.

A further objective of the present invention is to provide a power circuit having multiple stages of charge pumps, which uses at least a level detecting unit to detect an output voltage of at least a charge pump for controlling the switching frequency or multiple of at least a charge pump and saving power.

For achieving the objectives and effects described above, the present discloses a power circuit having multiple stages of charge pumps, which comprises a first charge pump, a second charge pump, a voltage stabilizing capacitor, and an output capacitor. The first charge pump adjusts an input voltage and produces a first output voltage. The second charge pump adjusts the first output voltage, produces a second output voltage, and outputs the second output voltage for driving a loading. The voltage stabilizing capacitor is coupled between the first and second charge pumps and connected externally to the output of the first charge pump. The output capacitor is coupled to the second charge pump for driving the loading. When the loading is changed to a heavy loading instantaneously, the charges output by the voltage stabilizing capacitor increase for supplying the first output voltage to the second charge pump. Thereby, the present achieves the effect of supplying a large transient current to the loading.

In addition, the power circuit having multiple stages of charge pumps according to the present invention further comprises at least a timing controller and at least a control circuit corresponding to the timing controller. The timing controller outputs a timing control signal to the control circuit. The control circuit outputs a clock signal or a multiple adjusting signal to the corresponding first or second charge pump according to the timing control signal. The first or second charge pump adjusts its own multiple according to the clock signal or the multiple adjusting signal for producing the first or second output voltage, which are provided to the scan driver for generating the plurality of scan driving signals. Thereby, by improving the switching frequency or multiple of the first or second charge pump in a voltage conversion time of the plurality of scan driving signals, voltages with sufficient rise rate or level can be provided to the scan driver; by reducing the switching frequency or multiple of the first or second charge pump in the voltage holding time of the plurality of scan driving signals, the level or rise rate of the first or second output voltage provided by the power circuit can be reduced. Consequently, the effect of reducing power consumption can be achieved.

Moreover, the power circuit having multiple stages of charge pumps according to the present invention further comprises at least a level detecting unit, which detects the first output voltage of the first charge pump or the second output voltage of the second charge pump and outputs a detecting signal to the control circuit according to the first or second output voltage. The control circuit further outputs the clock signal or multiple adjusting signal to the first or second charge pump according to the detecting signal for controlling the switching frequency or multiple of the first or second charge pump. Thereby, the present invention uses the level detecting unit to detect the output voltage of the first or second charge pump for controlling the switching frequency or multiple of the first or second charge pump. Hence, the objective of saving power can be achieved.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Beside, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
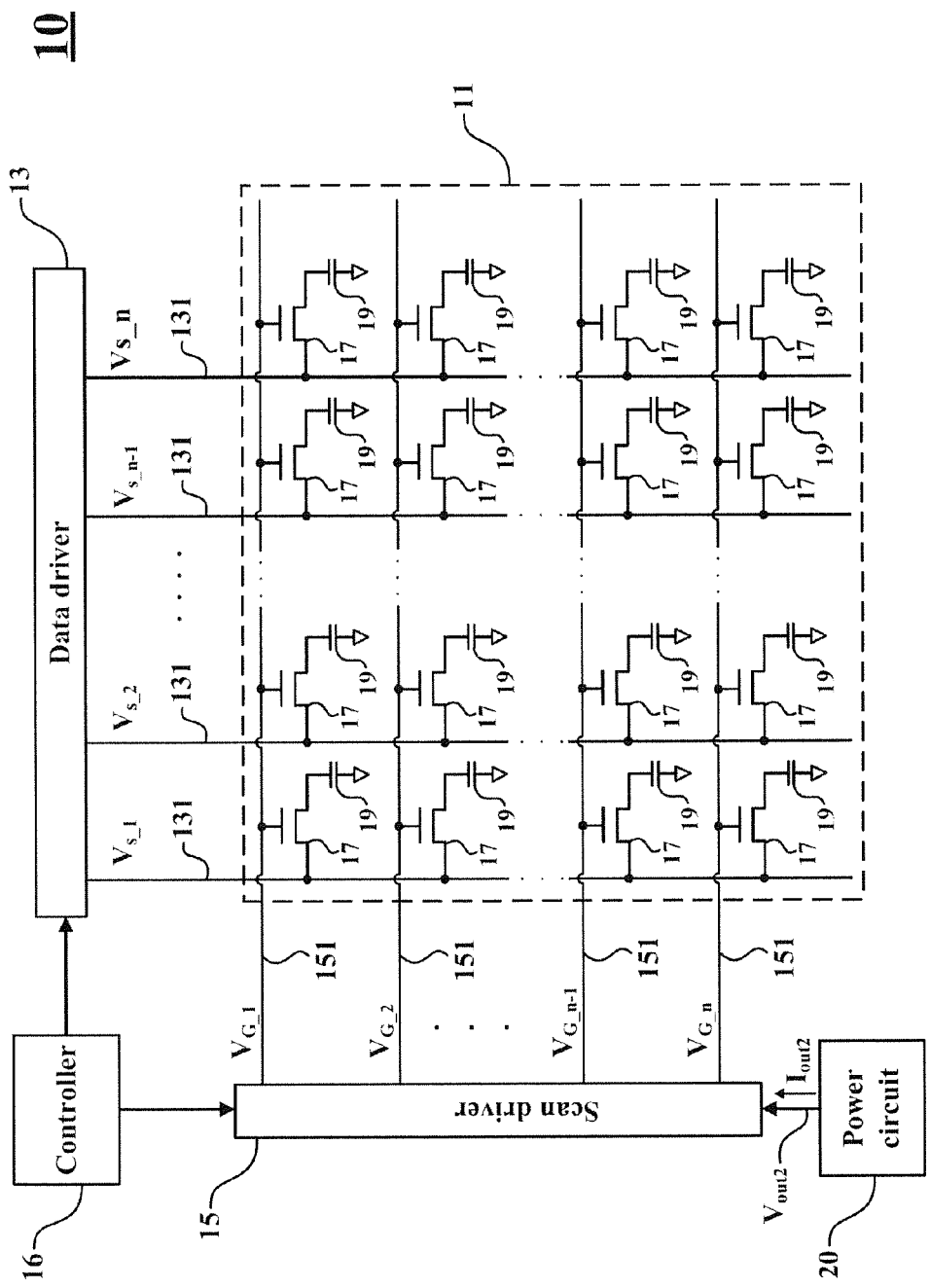
FIG. 1 shows a circuit diagram of the displaying device with the power circuit having multiple stages of charge pumps according to the first embodiment of the present invention.

FIG. 1 shows a circuit diagram of the displaying device with the power circuit having multiple stages of charge pumps according to the first embodiment of the present invention. As shown in the figure, the power circuit according to the present invention can be applied to various displaying devices such as TFT, TN, and STN displaying 10 devices. The displaying device comprises a panel 11, a data driver 13, a scan driver 15, a controller 16, and a power circuit 20. According to the present embodiment, the power circuit 20 of the displaying device 10 according to the present invention is applied, but not limited, to a TFT displaying device 10. The panel 11 according to the present embodiment has a plurality of TFTs 17 and a plurality of liquid crystal capacitors 19 for forming a plurality of pixels. The plurality of liquid crystal capacitors 19 are coupled to the plurality of TFTs, respectively. The gates of the plurality of TFTs 17 are coupled to the scan driver 15 via a corresponding plurality of scan lines 151, respectively; the sources of the plurality of TFTs 17 are coupled to the data driver 13 via a corresponding plurality of data lines 131, respectively.

The controller 16 is coupled to the data driver 13 and the scan driver 15. The controller 16 generates a plurality of control signals and transmits the plurality of control signals to the scan driver 15 and the data driver 13 for controlling the scan driver 15 to generate a plurality of scan driving signals ($V_{G\_1}$, $V_{G\_2}$ ... $V_{G\_n-1}$, $V_{G\_n}$) and the data driver 13 to generate a plurality of data signals ($V_{S\_1}$, $V_{S\_2}$ ... $V_{S\_n-1}$, $V_{S\_n}$) correspondingly. The data driver 13 transmits the plurality of data signals ($V_{S\_1}$, $V_{S\_2}$ ... $V_{S\_n-1}$, $V_{S\_n}$) to the sources of the plurality of TFTs 17 via the plurality of data lines 131. The scan driver 15 transmits the plurality of scan driving signals ($V_{G\_1}$, $V_{G\_2}$ ... $V_{G\_n-1}$, $V_{G\_n}$) to the gates of the plurality of TFTs 17 via the plurality of scan lines 151.

The power circuit 20 is coupled to the scan driver 15 and produces a second output voltage $V_{out2}$ and an output current $I_{out2}$ to the scan driver 15, so that the scan driver 15 can generate the plurality of scan driving signals ($V_{G\_1}$, $V_{G\_2}$ ... $V_{G\_n-1}$, $V_{G\_n}$). In addition, another power circuit also supplies power to the data driver 13, so that the data driver 13 can generate the plurality of data signals ($V_{S\_1}$, $V_{S\_2}$ ... $V_{S\_n-1}$, $V_{S\_n}$). The principle of the power circuit is similar to the power circuit 20 of the scan driver 15. Hence, the details will not be described again.

Figure 2:
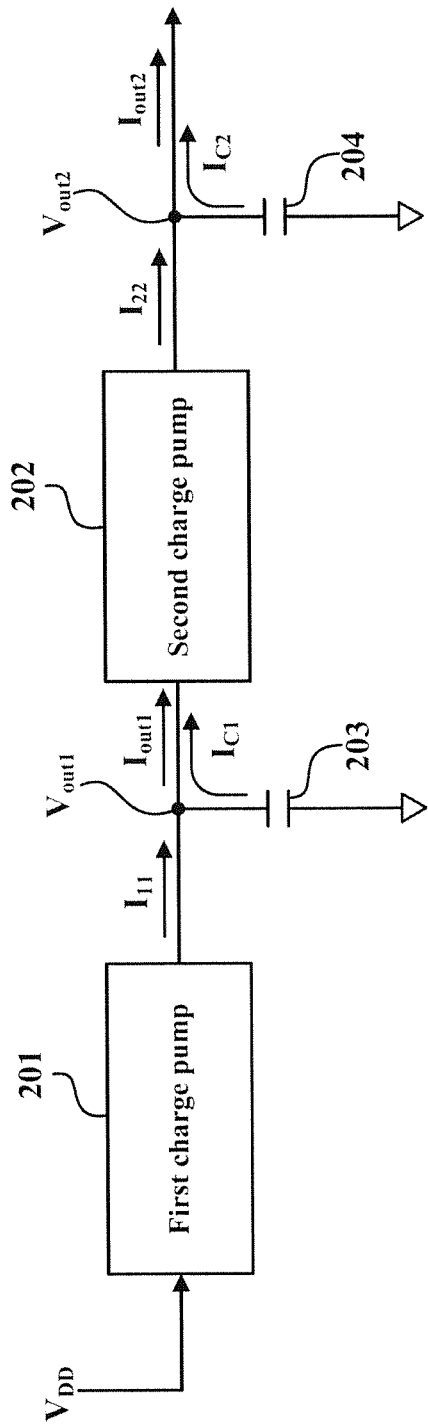
FIG. 2 shows a circuit diagram of the power circuit having multiple stages of charge pumps according to the first embodiment of the present invention.

Please refer to FIG. 2, which shows a circuit diagram of the power circuit having multiple stages of charge pumps according to the first embodiment of the present invention. As shown in the figure, the power circuit 20 comprises a first charge pump 201, a second charge pump 202, a voltage stabilizing capacitor 203, and an output capacitor 204. The first charge pump 201 produces a first output voltage $V_{out1}$ according to an input voltage $V_{DD}$. In other words, the first charge pump 201 adjusts the input voltage $V_{DD}$ and produces the first output voltage $V_{out1}$. The second charge pump 202 produces a second output voltage $V_{out2}$ according to the first output voltage $V_{out1}$. That is to say, the second charge pump 202 adjusts the first output voltage $V_{out1}$, produces the second output voltage $V_{out2}$, and outputs the second output voltage $V_{out2}$ for driving the loading. Because the power circuit 20 according to the present embodiment is applied to the displaying device 10, the loading described above is the plurality of pixels of the panel 11 in the displaying device 10. The second charge pump 202 outputs the second output voltage $V_{out2}$ to the scan driver 15 of the displaying device 10, so that the scan driver 15 can generate the plurality of scan driving signals ($V_{G\_1}, V_{G\_2} \ldots, V_{G\_n-1}, V_{G\_n}$). The voltage stabilizing capacitor 203 is coupled between the first and second charge pumps 201, 202 and connected externally to the output of the first charge pump 201. The output capacitor 204 is coupled to the output of the second charge pump 202, so that the output capacitor 204 and the second charge pump 202 can supply the second output voltage $V_{out2}$ to the loading. Because the present embodiment is applied to the displaying device 10, the output capacitor 204 is connected between the output of the second charge pump 202 and the scan driver 15. The scan driver 15 can also be replaced by any electronic device requiring large transient currents.

When the loading becomes a heavy loading instantaneously, namely, the required current of the plurality of pixels increases, the second output current $I_{out2}$ supplied by the power circuit 20 to the scan driver 15 increases accordingly for providing the required high transient current. Because a charge-pump current $I_{22}$ output by the output of the second charge pump 202 cannot rise to the current required by the plurality of pixels instantaneously and the first output current $I_{out1}$ received by the second charge pump 202 corresponds to the charge-pump current $I_{22}$, rising the first output current $I_{out1}$ increases the charge-pump current $I_{22}$ correspondingly. Thereby, the voltage stabilizing capacitor 203 is disposed, so that charges can be output to the second charge pump 202 instantaneously as the loading becomes heavy. In other words, the voltage stabilizing capacitor 203 provides a first voltage stabilizing current $I_{C1}$ to the second charge pump 202 instantaneously, so that the sum of the charge-pump current and the first voltage stabilizing current $I_{C1}$ increases instantaneously. Thus, the charge-pump current $I_{22}$ can be increased to the current required by the plurality of pixels. When the loading is heavy and the voltage stabilizing capacitor 203 cannot supply sufficient first voltage stabilizing current $I_{C1}$, the output capacitor 204 increase the output charges. Namely, a second voltage stabilizing current $I_{C2}$ is provided to the scan driver 15, so that the sum of the charge-pump current $I_{22}$ and the second voltage stabilizing current $I_{C2}$ is equal to the second output current $I_{out2}$ ($I_{22}+I_{C2}=I_{out2}$) for enhancing the second output current $I_{out2}$ output by the power circuit 20 and supplying the loading with a large transient current.

Based on the above description, when the loading is a heavy loading and the second output current $I_{out2}$ increases instantaneously, if the output current (the charge-pump current $I_{22}$) of the second charge pump 202 cannot follow the required current of the loading, instability occurs in the first and second output voltages $V_{out1}$, $V_{out2}$. Then, the voltage stabilizing capacitor 203 and the output capacitor 204 provide the first or second voltage stabilizing current $I_{C1}$, $I_{C2}$ to raise the current of the scan driver 15 to the current level required by the loading. In other words, they stabilize the current, which also has the effect of stabilizing the voltage. Thereby, the voltage stabilizing capacitor 203 and the output capacitor 204 can both applied to stabilizing voltage.

The first or second charge pump 201, 202 can have any predetermined multiple according to the requirements, respectively. The multiple of the first charge pump 201 is the multiple between the input voltage $V_{DD}$ and the first output voltage $V_{out1}$; the multiple of the second charge pump 202 is the multiple between the first output voltage $V_{out1}$ and the second output voltage $V_{out2}$.

Besides, the present invention is not limited to the case in which only the first and second charge pumps 201, 202 are connected in series in the power circuit; two or more charge pumps can be connected in series as well. A voltage stabilizing capacitor is coupled to the output of each charge pump for achieving the effects of providing a large transient current at the output and stabilizing voltage.

Figure 3:
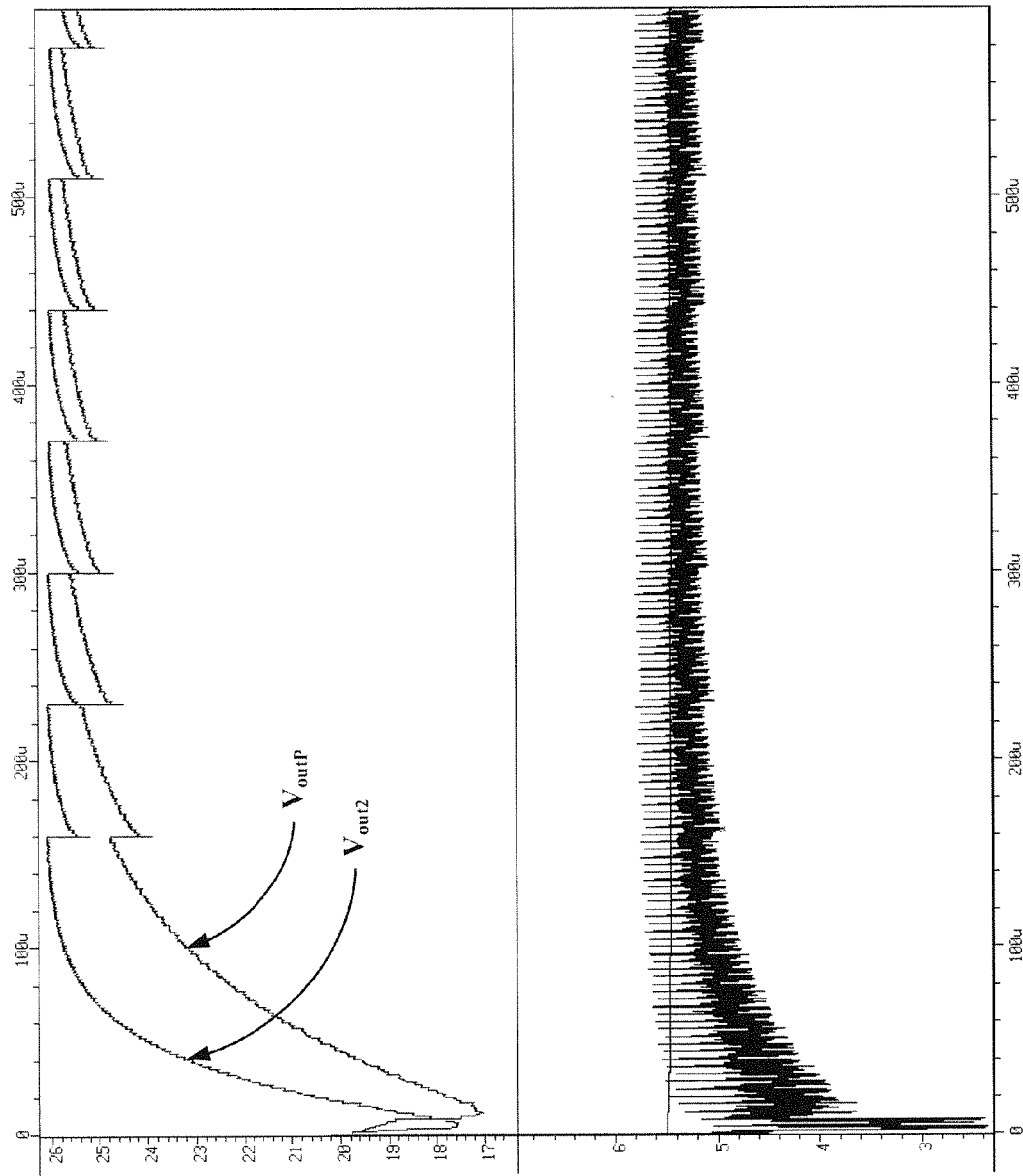
FIG. 3 shows diagrams of output voltages according to the present invention and the prior art.
Figure 4:
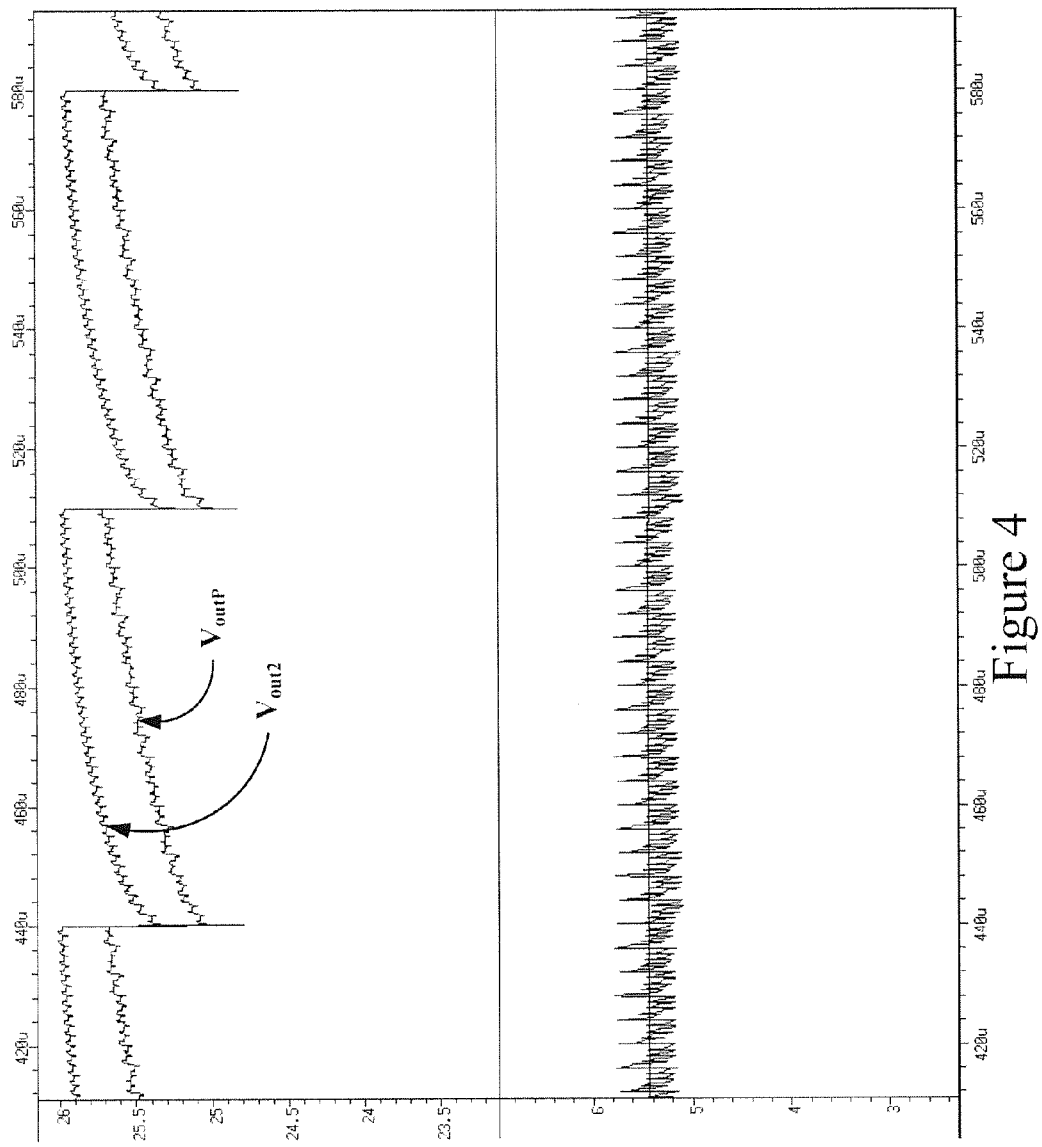
FIG. 4 shows enlarged diagrams of output voltages according to the present invention and the prior art.

Please refer to FIG. 3 and FIG. 4. FIG. 3 shows diagrams of output voltages according to the present invention and the prior art; FIG. 4 shows enlarged diagrams of output voltages according to the present invention and the prior art. The output voltage $V_{outP}$ represents the output voltage without the voltage stabilizing capacitor 203 and/or the output capacitor 204 in the circuit structure according to the present invention. In other words, it represents the output voltage in the condition according to the prior art.

As shown in FIGS. 3 and 4, the capability of voltage recovery from the low-voltage point to the predetermined level of the second output voltage $V_{out2}$ having the voltage stabilizing capacitor 203 and the output capacitor 204 according to the present invention is higher than that of the output voltage $V_{outP}$ without the voltage stabilizing capacitor 203 and the output capacitor 204.

Figure 5:
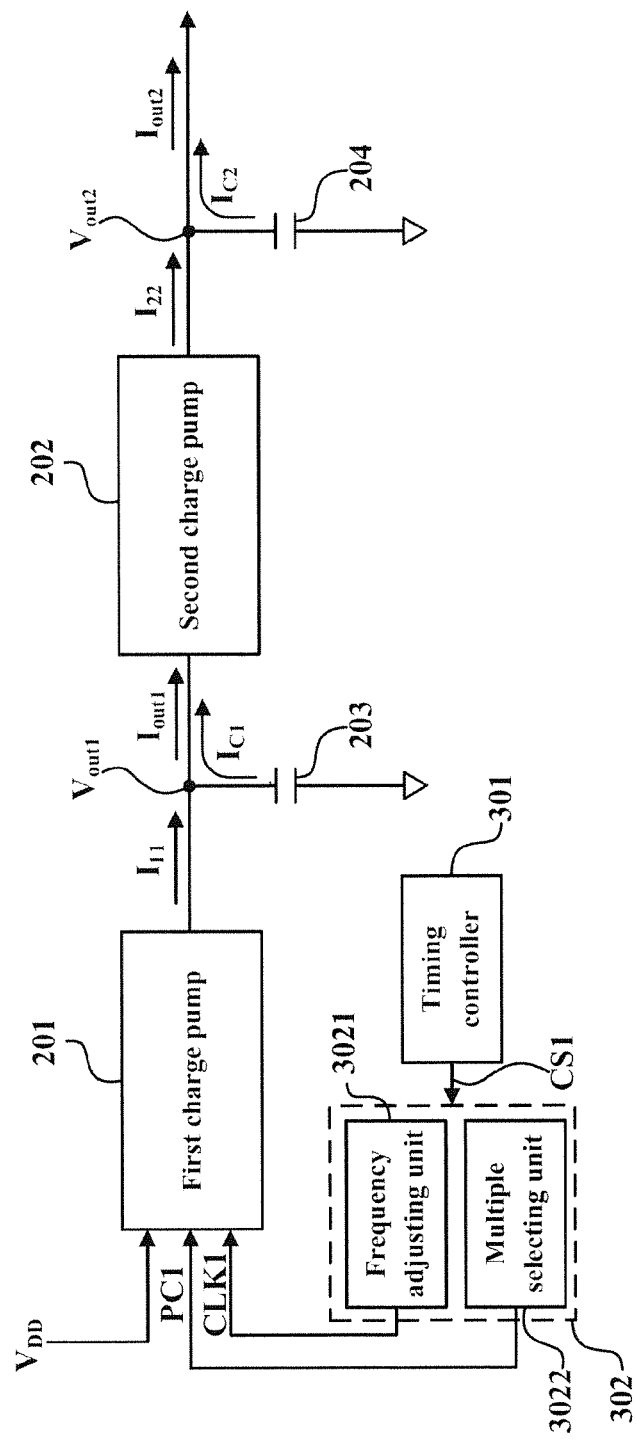
FIG. 5 shows a circuit diagram of the power circuit having multiple stages of charge pumps according to the second embodiment of the present invention.

FIG. 5 shows a circuit diagram of the power circuit having multiple stages of charge pumps according to the second embodiment of the present invention. The difference between the present embodiment and the first one is that the present embodiment further comprises a timing controller 301 and a control circuit 302. The rest circuits are identical to the first embodiment, and will not be described again. As shown in the figure, the timing controller 301 outputs a timing control signal CS1 to the control circuit 302. The timing of the timing control signal CS1 is related to the timing of the plurality of scan driving signals ($V_{G\_1}, V_{G\_2} \ldots V_{G\_n-1}, V_{G\_n}$) of the display device 10. The control circuit 302 outputs a clock signal CLK1 or a multiple adjusting signal PC1 to the first charge pump 201 according to the timing control signal CS1. The first charge pump 201 adjusts the input voltage $V_{DD}$ according to the clock signal CLK1 or the multiple adjusting signal PC1 for producing the first output voltage $V_{out1}$ and outputs the first output voltage $V_{out1}$ to the second charge pump 202, so that the second charge pump 202 can produce the second output voltage $V_{out2}$. Then the second charge pump 202 outputs the second output voltage $V_{out2}$ to the scan driver 15, so that the scan driver 15 can generate the plurality of scan driving signals ($V_{G\_1}, V_{G\_2} \ldots V_{G\_n-1}, V_{G\_n}$).

According to the above description, the control circuit 302 generates the clock signal CLK1 according to the timing control signal CS1 and transmits the clock signal CLK1 to the first charge pump 201 for controlling the internal switch of the first charge pump 201 to switch frequency and thus controlling the rise rate of the first output voltage $V_{out1}$ of the first charge pump 201. The control circuit 302 generates the multiple adjusting signal PC1 according to the timing control signal CS1 and transmits the multiple adjusting signal PC1 to the first charge pump 201 for controlling the multiple between the input voltage $V_{DD}$ of the first charge pump 201 and the first output voltage $V_{out1}$. In addition, the control circuit 302 can also generate and transmits the clock signal CLK1 and the multiple adjusting signal PC1 to the first charge pump 201 simultaneously for controlling the rise rate and level of the first output voltage $V_{out1}$ of the first charge pump 201 at the same time.

The clock signal CLK1 determines the switching frequency of the first charge pump 201; the multiple adjusting signal PC1 determines the multiple, namely, the multiple between the input voltage $V_{DD}$ and the first output voltage $V_{out1}$, of the first charge pump 201. The switching frequency of the first charge pump 201 described above corresponds to the rise rate of the first output voltage $V_{out1}$ output by the first charge pump 201. This rise rate is the rate of the first output voltage $V_{out1}$ rising from a lower level to a predetermined level; the switching frequency is the frequency at which the first charge pump 201 switches the charging capacitor. If the frequency is higher, the charging rate of the charging capacitor is faster. Then the rise rate of the first output voltage $V_{out1}$ of the first charge pump 201 is faster accordingly. This is well to a person having ordinary skill in the art. Hence, the details will not be described further. The multiple of the first charge pump 201 corresponds to the level of the first output voltage $V_{out1}$ output by the first charge pump 201. That is to say, the multiple of the first charge pump 201 is the multiple between the input voltage $V_{DD}$ and the first output voltage $V_{out1}$. If the input voltage $V_{DD}$ is fixed, if the multiple of the first charge pump 201 is higher, then the level of the first output voltage $V_{out1}$ is higher. Moreover, the first output voltage $V_{out1}$ can be raised to a level higher than the predetermined level by increasing the multiple of the first charge pump 201, shortening the time of the first output voltage $V_{out1}$ rising to the predetermined level. Thereby, increasing the multiple of the first charge pump 201 can also achieve the effect of improving the rise rate of the first output voltage $V_{out1}$.

Refer again to FIG. 5. The control circuit 302 can include a frequency adjusting unit 3021 and a multiple selecting unit 3022. The frequency adjusting unit 3021 generates the clock signal CLK1 according to the timing control signal CS1 and transmits the clock signal CLK1 to the first charge pump 201 for controlling the switching frequency of the first charge pump 201. The multiple selecting unit 3022 generates the multiple adjusting signal PC1 according to the timing control signal CS1 and transmits the multiple adjusting signal PC1 to the first charge pump 201 for controlling the multiple of the first charge pump 201. Alternatively, the control circuit 302 can include one of the frequency adjusting unit 3021 and the multiple selecting unit 3022. In this case, only the clock signal CLK1 or the multiple adjusting signal PC1 is output to the first charge pump 201 for determining the switching frequency or the multiple of the first charge pump 201.

The timing controller 301 can set the output timing control signal CS in advance, so that the control circuit 302 can control the switching frequency and/or the multiple of the first charge pump 201 at a specific time.

Figure 6:
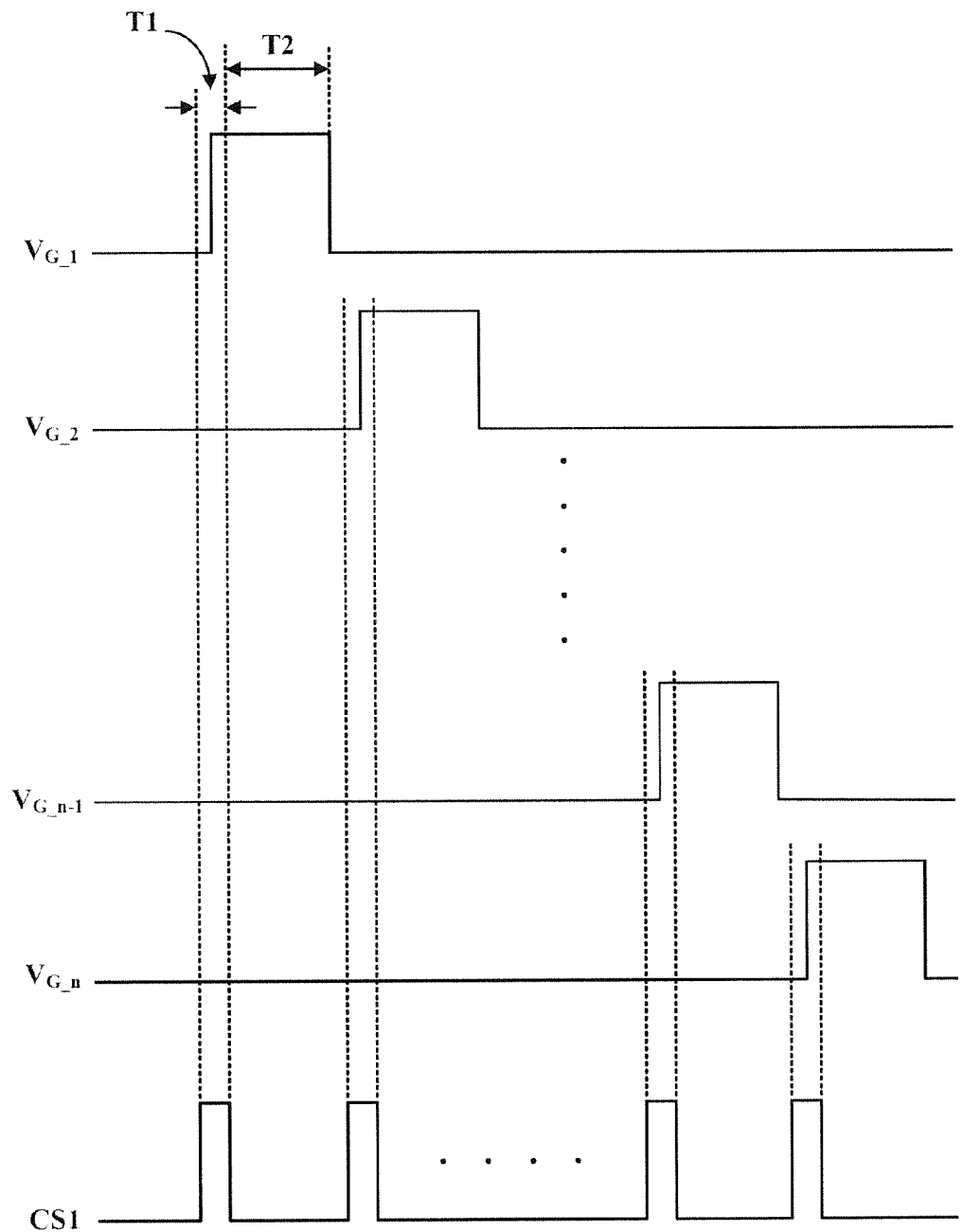
FIG. 6 shows a schematic diagram of the pulses of the scan driving signals of the power circuit having multiple stages of charge pumps in the displaying device according to the second embodiment of the present invention.

FIG. 6 shows a schematic diagram of pulses of the scan driving signals of the power circuit having multiple stages of charge pumps in the displaying device according to the second embodiment of the present invention. As shown in the figure, the plurality of scan driving signals ($V_{G\_1}$, $V_{G\_2}$ ... $V_{G\_n-1}$, $V_{G\_n}$) are pulse signals. In addition, the rise rate and level of the plurality of scan driving signals ($V_{G\_1}$, $V_{G\_2}$ ... $V_{G\_n-1}$, $V_{G\_n}$) correspond to the rise rate and level of the second output voltage $V_{out2}$ output by the power circuit 20. Because the plurality of scan driving signals ($V_{G\_1}$, $V_{G\_2}$ ... $V_{G\_n-1}$, $V_{G\_n}$) are generated by the second output voltage $V_{out2}$ provided by the power circuit 20 with identical operating methods, only the scan driving signal $V_{G\_1}$ is used as an example according to the present embodiment. The rest will not be described again.

In a voltage conversion time T1 of the scan driving signal $V_{G\_1}$, owing to the requirement of raising the scan driving signal $V_{G\_1}$ to a predetermined level from zero volt, the scan driver 15 needs a voltage having higher rise rate or level than the original second output voltage $V_{out2}$. Because both of the rise rate and level of the scan driving signal $V_{G\_1}$ correspond to the rise rate and level of the second output voltage $V_{out2}$ and the rise rate and level of the second output voltage $V_{out2}$ correspond to the rise rate and level of the first output voltage $V_{out1}$, raising the rise rate or level of the first output voltage $V_{out1}$ raises the rise rate or level of the scan driving signal $V_{G\_1}$. Accordingly, the control circuit 302 outputs the clock signal CLK1 or the multiple adjusting signal PC1 to the first charge pump 201 according to the timing control signal CS1 for increasing the switching frequency of the first charge pump 201 and thus improving the rise rate of the first output voltage $V_{out1}$. The first charge pump 201 outputs the first output voltage $V_{out1}$ having higher rise rate to the second charge pump 202 for improving the rise rate of the second output voltage $V_{out2}$, which is then output to the scan driver 15. Alternatively, the multiple of the first charge pump 201 is increased for increasing the level of the first output voltage $V_{out1}$. The first charge pump 201 outputs the first output voltage $V_{out1}$ with raised level to the second charge pump 202 for increasing the level of the second output voltage $V_{out2}$, which is then output to the scan driver 15.

In a voltage holding time T2 of the scan driving signal $V_{G\_1}$, owing to the requirement of keeping the scan driving signal $V_{G\_1}$ at a predetermined level, the scan driver 15 does not need a voltage having excessively high rise rate or level. Accordingly, the control circuit 302 outputs the clock signal CLK1 or the multiple adjusting signal PC1 to the first charge pump 201 according to the timing control signal CS1 for reducing the switching frequency of the first charge pump 201 and thus lowering the rise rate of the first output voltage $V_{out1}$. The first charge pump 201 outputs the first output voltage $V_{out1}$ with lowered rise rate to the second charge pump 202 for lowering the rise rate of the second output voltage $V_{out2}$, which is then output to the scan driver 15. Alternatively, the multiple of the first charge pump 201 is reduced for lowering the level of the first output voltage $V_{out1}$. The first charge pump 201 outputs the first output voltage $V_{out1}$ with lowered level to the second charge pump 202 for lowering the level of the second output voltage $V_{out2}$, which is then output to the scan driver 15.

Based on the above description, in the voltage conversion time T1, the control circuit 302 outputs the clock signal CLK1 or the multiple adjusting signal PC1 to the first charge pump 201 according to the timing control signal CS1 for increasing the switching frequency or multiple of the first charge pump 201. The switch frequency and the multiple of the first charge pump 201 can also be increased simultaneously for increasing the rise rate and the level of the first output voltage $V_{out1}$ at the same time. In the voltage holding time T2, the control circuit 302 outputs the clock signal CLK1 or the multiple adjusting signal PC1 to the first charge pump 201 according to the timing control signal CS1 for reducing the switching frequency or multiple of the first charge pump 201. The switch frequency and the multiple of the first charge pump 201 can also be reduced simultaneously for reducing the rise rate and the level of the first output voltage $V_{out1}$ at the same time.

Figure 7:
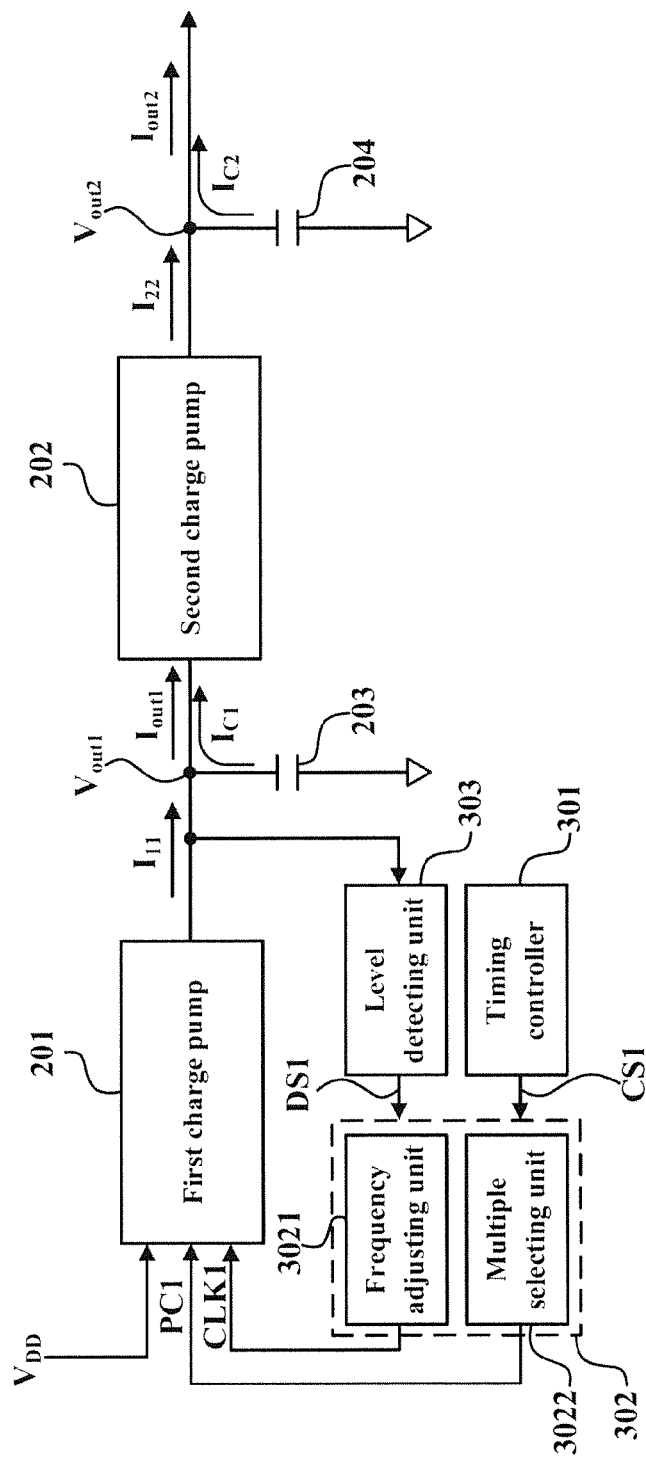
FIG. 7 shows a circuit diagram of the power circuit having multiple stages of charge pumps in the displaying device according to the third embodiment of the present invention.

Please refer to FIG. 7, which shows a circuit diagram of the power circuit having multiple stages of charge pumps in the displaying device according to the third embodiment of the present invention. The difference between the present embodiment and the second embodiment is that the present embodiment further comprises a level detecting unit 303. The rest circuits are identical to the first embodiment, and will not be described again. As shown in the figure, the level detecting unit 303 is coupled between the first charge pump 201 and the control circuit 302. It detects the first output voltage $V_{out1}$ and outputs a detecting signal DS1 to the control circuit 302 according to the first output voltage $V_{out1}$. The control circuit 302 further outputs the clock signal CLK1 or the multiple adjusting signal PC1 according to the detecting signal DS1 for controlling the switching frequency or multiple of the first charge pump 201. Thereby, the level detecting unit 303 according to the present invention detects the first output voltage $V_{out1}$ output by the first charge pump 201 for controlling the switching frequency or multiple of the first charge pump 201 and thus achieving the purpose of saving power.

The level detecting unit 303 has a threshold value $V_{H1}$. The level detecting unit 303 detects the first output voltage $V_{out1}$ and compares the threshold value $V_{H1}$ with the first output voltage $V_{out1}$. When the first output voltage $V_{out1}$ is higher than the threshold value $V_{H1}$, the level detecting unit 303 outputs the detecting signal DS1, which makes the control circuit 302 to output the clock signal CLK1 for reducing the switching frequency of the first charge pump 201 or output the multiple adjusting signal PC1 for reducing the multiple of the first charge pump 201. In other words, when the level detecting unit 303 judges that the first output voltage $V_{out1}$ is too high, the switching frequency or multiple of the first charge pump 201 is reduced for further reducing the level or rise rate of the first output voltage $V_{out1}$ output by the first charge pump 201.

In addition, the level detecting unit 303 further has a threshold value $V_{L1}$. The level detecting unit 303 detects the first output voltage $V_{out1}$ and compares the threshold value $V_{L1}$ with the first output voltage $V_{out1}$. When the first output voltage $V_{out1}$ is lower than the threshold value $L_{L1}$, the level detecting unit 303 outputs the detecting signal DS1, which makes the control circuit 302 to output the clock signal CLK1 for increasing the switching frequency of the first charge pump 201 or output the multiple adjusting signal PC1 for increasing the multiple of the first charge pump 201. In other words, when the level detecting unit 303 judges that the first output voltage $V_{out1}$ is too low, the switching frequency or multiple of the first charge pump 201 is increased for further increasing the level or rise rate of the first output voltage $V_{out1}$ output by the first charge pump 201.

Moreover, when the level detecting unit 303 judges that the first output voltage $V_{out1}$ is higher than the threshold value $V_{H1}$, the control circuit 302 can also output the clock signal CLK1 and the multiple adjusting signal PC1 simultaneously for reducing the switching frequency and the multiple of the first charge pump 201 simultaneously and thus reducing the rise rate and level of the first output voltage $V_{out1}$ at the same time. When the level detecting unit 303 judges that the first output voltage $V_{out1}$ is lower than the threshold value $V_{L1}$, the control circuit 302 can also output the clock signal CLK1 and the multiple adjusting signal PC1 simultaneously for increasing the switching frequency and the multiple of the first charge pump 201 simultaneously and thus increasing the rise rate and level of the first output voltage $V_{out1}$ at the same time. The threshold value $V_{H1}$ of the level detecting unit 303 can be greater or equal to the threshold value $V_{L1}$. Furthermore, the present invention is not limited to the above case in which the threshold value $V_{H1}$ is different from the threshold value $V_{L1}$; the threshold value $V_{H1}$ can also be identical to the threshold value $V_{L1}$.

Figure 8:
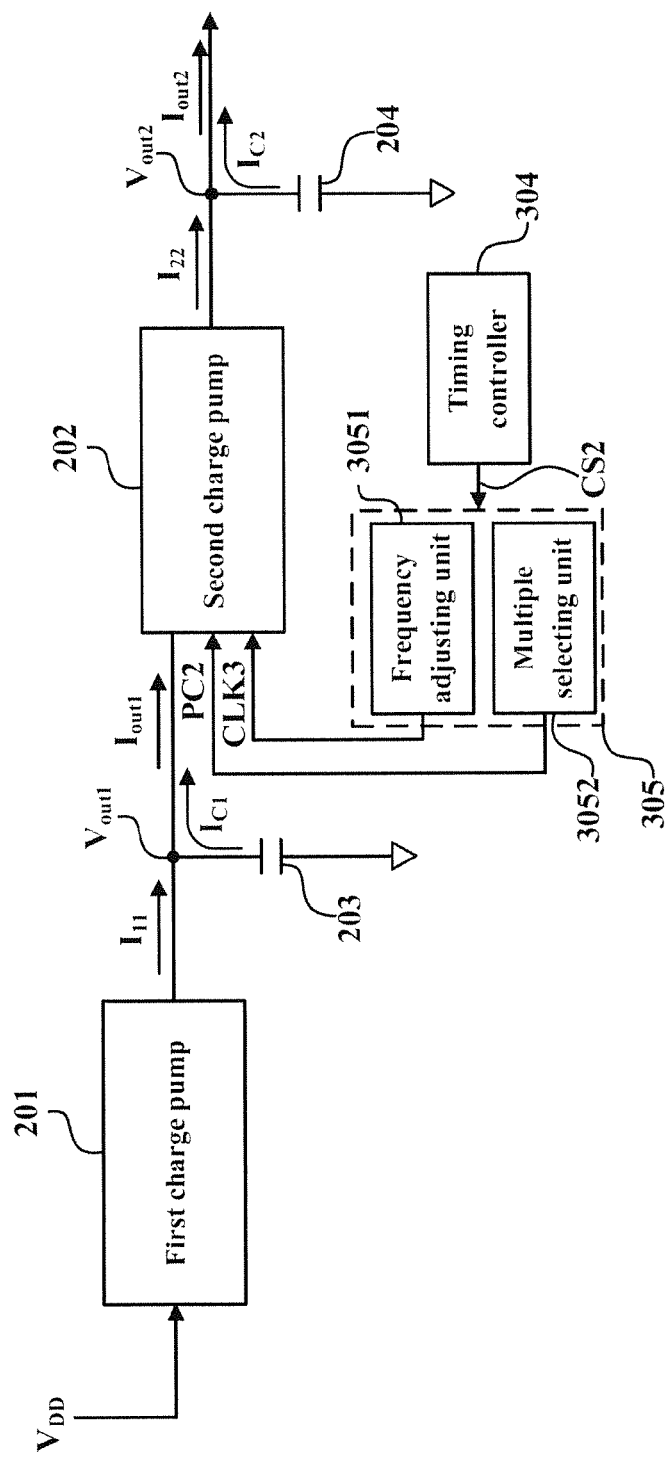
FIG. 8 shows a circuit diagram of the power circuit having multiple stages of charge pumps in the displaying device according to the fourth embodiment of the present invention.

Please refer to FIG. 8, which shows a circuit diagram of the power circuit having multiple stages of charge pumps in the displaying device according to the fourth embodiment of the present invention. As shown in the figure, the present embodiment comprises a timing controller 304 and a control circuit 305. The timing controller 304 outputs a timing control signal CS2 to the control circuit 305. The control circuit 305 outputs a clock signal CLK3 or a multiple adjusting signal PC2 to the second charge pump 202 according to the timing control signal CS2. The second charge pump 202 adjusts the first output voltage $V_{out1}$ for producing the second output voltage $V_{out2}$. The clock signal CLK3 determines the switching frequency of the second charge pump 202; the multiple adjusting signal PC2 determines the multiple of the second charge pump 202. The timing controller 304 can set the output timing control signal CS2 in advance, so that the control circuit 305 can control the switching frequency and/or the multiple of the second charge pump 202 at a specific time. The operating methods and effects of the timing controller 304 and the control circuit 305 according to the present embodiment are identical to those of the timing controller 301 and the control circuit 302 according to the second embodiment. Hence, the details will not be described again.

The control circuit 305 can include a frequency adjusting unit 3051 and a multiple selecting unit 3052. The frequency adjusting unit 3051 generates the clock signal CLK3 according to the timing control signal CS2 and transmits the clock signal CLK3 to the second charge pump 202 for controlling the switching frequency of the second charge pump 202. The multiple selecting unit 3052 generates the multiple adjusting signal PC2 according to the timing control signal CS2 and transmits the multiple adjusting signal PC2 to the second charge pump 202 for controlling the multiple of the second charge pump 202. Alternatively, the control circuit 305 can include one of the frequency adjusting unit 3051 and the multiple selecting unit 3052. In this case, only the clock signal CLK3 or the multiple adjusting signal PC2 is output to the second charge pump 202 for determining the switching frequency or the multiple of the second charge pump 202.

Figure 9:
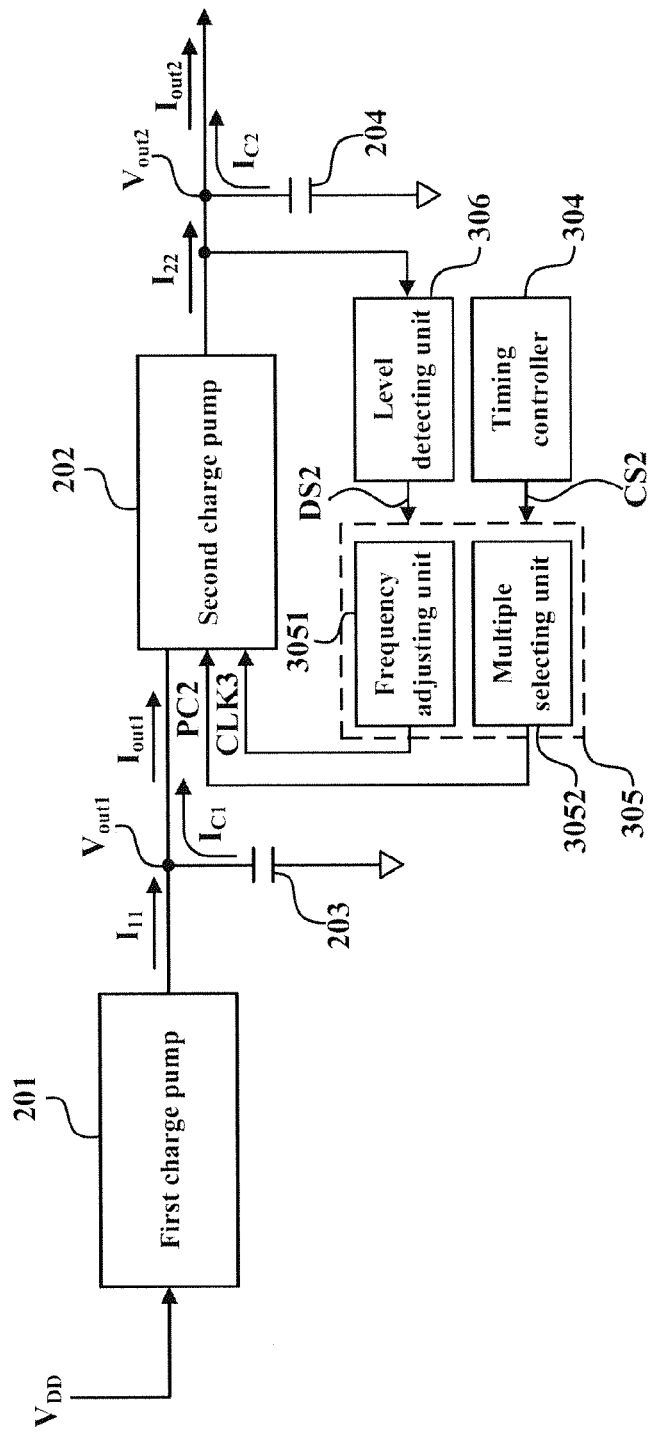
FIG. 9 shows a circuit diagram of the power circuit having multiple stages of charge pumps in the displaying device according to the fifth embodiment of the present invention.

Please refer to FIG. 9, which shows a circuit diagram of the power circuit having multiple stages of charge pumps in the displaying device according to the fifth embodiment of the present invention. The difference between the present embodiment and the fourth embodiment is that the present embodiment further comprises a level detecting unit 306. The rest circuits are identical to the fourth embodiment, and will not be described again. As shown in the figure, the level detecting unit 306 is coupled between the output of the second charge pump 202 and the control circuit 302. It detects the second output voltage $V_{out2}$ of the second charge pump 202 and outputs a detecting signal DS2 to the control circuit 305 according to the second output voltage $V_{out2}$. According to the present embodiment, the control circuit 305 further outputs the clock signal CLK3 or the multiple adjusting signal PC2 according to the detecting signal DS2 for controlling the switching frequency or multiple of the second charge pump 202. Thereby, the level detecting unit 306 according to the present invention detects the second output voltage $V_{out2}$ output by the second charge pump 202 for controlling the switching frequency or multiple of the second charge pump 202 and thus achieving the purpose of saving power.

The level detecting unit 306 has a threshold value $V_{H2}$. The level detecting unit 306 detects the second output voltage $V_{out2}$ and compares the threshold value $V_{H2}$ with the second output voltage $V_{out2}$. When the second output voltage $V_{out2}$ is higher than the threshold value $V_{H2}$, the level detecting unit 306 outputs the detecting signal DS2, which makes the control circuit 305 to output the clock signal CLK3 for reducing the switching frequency of the second charge pump 202 or output the multiple adjusting signal PC2 for reducing the multiple of the second charge pump 2021. In other words, when the level detecting unit 306 judges that the second output voltage $V_{out2}$ is too high, the switching frequency or multiple of the second charge pump 202 is reduced for further reducing the level or rise rate of the second output voltage $V_{out2}$ output by the second charge pump 202.

In addition, the level detecting unit 306 further has a threshold value $V_{L2}$. The level detecting unit 306 detects the second output voltage $V_{out2}$ and compares the threshold value $V_{L2}$ with the second output voltage $V_{out2}$. When the second output voltage $V_{out2}$ is lower than the threshold value $V_{L2}$, the level detecting unit 306 outputs the detecting signal DS2, which makes the control circuit 305 to output the clock signal CLK3 for increasing the switching frequency of the second charge pump 202 or output the multiple adjusting signal PC2 for increasing the multiple of the second charge pump 202. In other words, when the level detecting unit 306 judges that the second output voltage $V_{out2}$ is too low, the switching frequency or multiple of the second charge pump 202 is increased for further increasing the level or rise rate of the second output voltage $V_{out2}$ output by the second charge pump 202. The threshold value $V_{H2}$ of the level detecting unit 306 can be greater or equal to the threshold value $V_{L2}$. Furthermore, the present invention is not limited to the above case in which the threshold value $V_{H2}$ is different from the threshold value $V_{L2}$; the threshold value $V_{H2}$ can also be identical to the threshold value $V_{L2}$.

Figure 10:
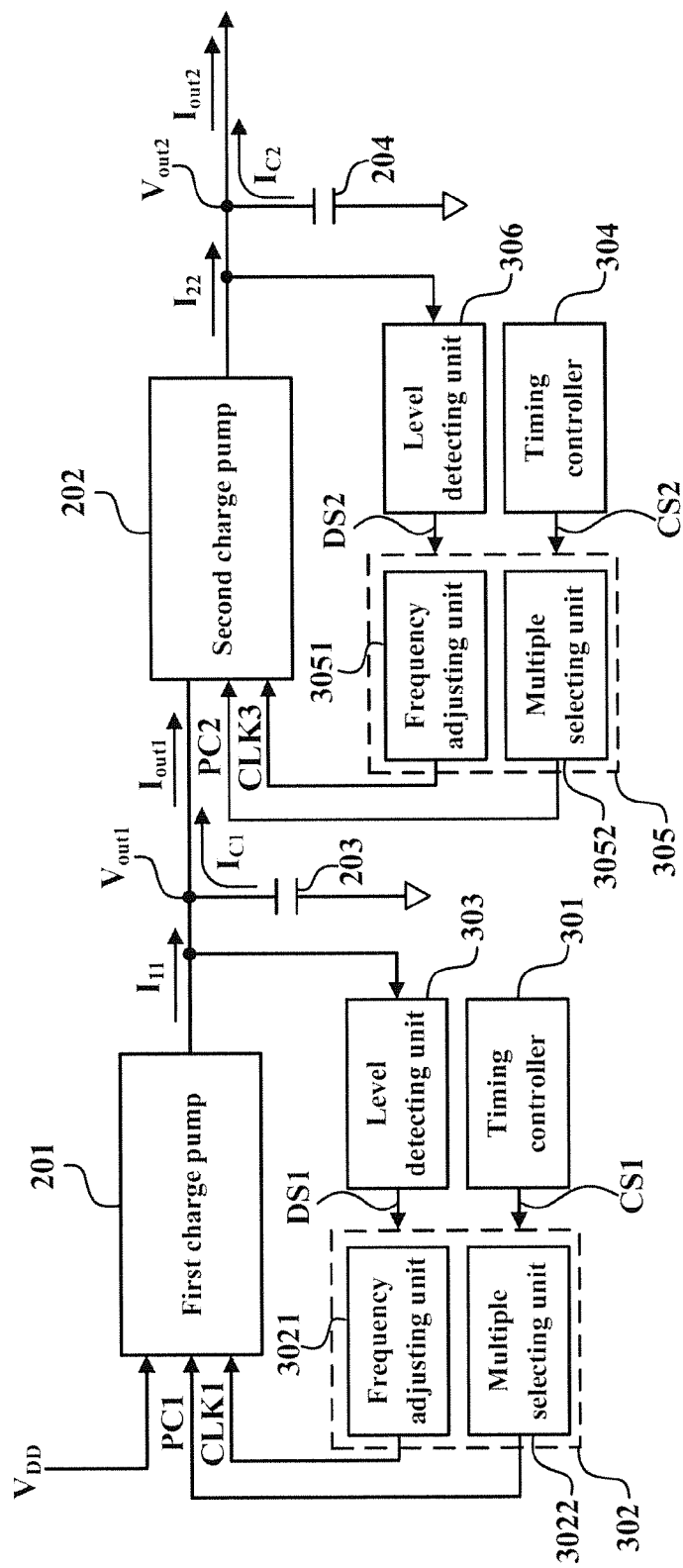
FIG. 10 shows a circuit diagram of the power circuit having multiple stages of charge pumps in the displaying device according to the sixth embodiment of the present invention.

Please refer to FIG. 10, which shows a circuit diagram of the power circuit having multiple stages of charge pumps in the displaying device according to the sixth embodiment of the present invention. As shown in the figure, the control circuit 302 controls the first charge pump 201 according to the timing controller 301 and the level detecting unit 303 for determining the multiple and switching frequency of the first charge pump 201; the control circuit 305 controls the second charge pump 202 according to the timing controller 304 and the level detecting unit 306 for determining the multiple and switching frequency of the second charge pump 202. According to the above description, it is known that the circuit according to the present embodiment is the combination of the third and fifth embodiments. The operating method and principle according to the present embodiment are the same as those according to the third and fifth embodiments. Hence, the details will not be described again.

Moreover, the power circuit having multiple stages of charge pumps in the displaying device according to the present invention can be the circuit disclosed in the sixth embodiment of the present invention, in which one of the timing controller 301 and the level detecting unit 303 or one of the timing controller 304 and the level detecting unit 306 is removed. Only one of the timing controller 301 and the level detecting unit 303 is used for controlling the control circuit 302; and only one of the timing controller 304 and the level detecting unit 306 is used for controlling the control circuit 305.

Figure 11:
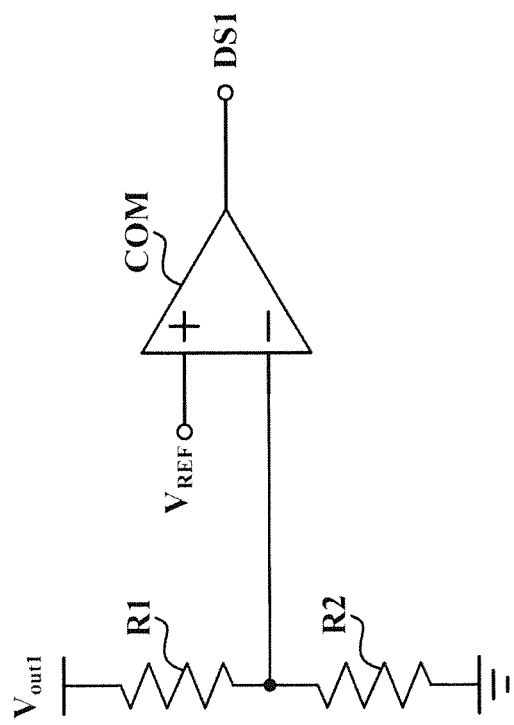
FIG. 11 shows a circuit diagram of the level detecting circuit according to a preferred embodiment of the present invention.

Please refer to FIG. 11, which shows a circuit diagram of the level detecting circuit according to a preferred embodiment of the present invention. Because the circuit structures of the level detecting units 303, 306 according to the present invention can be identical, only the level detecting unit 303 will be described.

As shown in the figure, the level detecting unit 303 comprises a comparator COM and a plurality of resistors R1, R2. A first terminal of the resistor R1 is coupled to the first output voltage $V_{out1}$; the first terminal of the resistor R2 is coupled to a second terminal of the resistor R1; a second terminal of the resistor R2 is coupled to the ground. A positive input of the comparator COM receives a reference voltage $V_{REF}$; a negative input of the comparator COM is coupled to the second terminal of the resistor R1 and the first terminal of the resistor R2 and used for receiving the divided voltage of the first output voltage $V_{out1}$ by the resistors R1, R2.

According to the present embodiment, the threshold value $V_{H1}$ is designed to be equal to the threshold value $V_{L1}$. In addition, when the voltage received by the negative input of the comparator COM is greater than the reference voltage $V_{REF}$, namely, the first output voltage $V_{out1}$ greater than the threshold value, the comparator COM outputs the low-level detecting signal DS1. On the other hand, when the voltage received by the negative input of the comparator COM is smaller than the reference voltage $V_{REF}$, namely, the first output voltage $V_{out1}$ smaller than the threshold value, the comparator COM outputs the high-level detecting signal DS1. Accordingly, the level detecting unit 303 can detect the level of the first output voltage $V_{out1}$ and output the corresponding detecting signal DS1.

Figure 12:
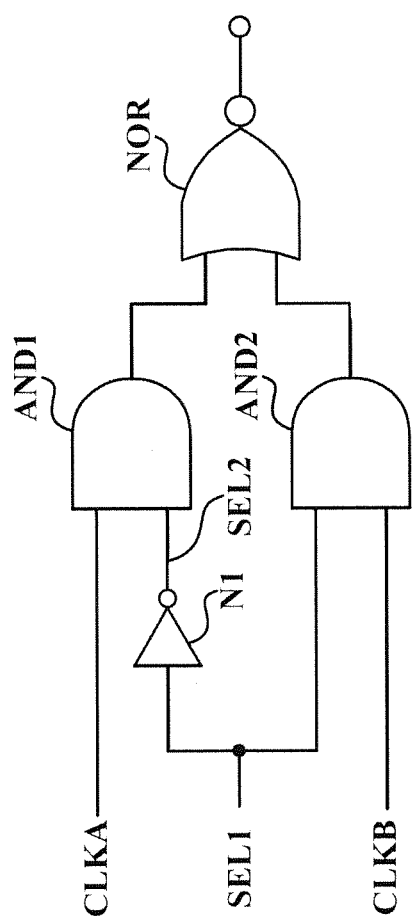
FIG. 12 shows a circuit diagram of the control circuit according to a preferred embodiment of the present invention.

Please refer to FIG. 12, which shows a circuit diagram of the control circuit according to a preferred embodiment of the present invention. Because the circuit structures of the control circuits 302, 305 according to the present invention can be identical, only the control circuits 302 will be described.

As shown in the figure, the control circuit 302 according to the present embodiment can be the frequency adjusting unit 3021 or the multiple selecting unit 3022. The control circuit 302 comprises an inverter N1, a plurality of AND gates AND1, AND2, and a NOR gate. An input of the inverter N1 receives a control signal SEL1, inverts the control signal SEL1 to a control signal SEL2, and outputs the control signal SEL2. A first terminal of the AND gate AND1 receives a predetermined clock signal CLKA; a second input of the AND gate AND1 receives the control signal SEL2. A first terminal of the AND gate AND2 receives a predetermined clock signal CLKB; a second terminal of the AND gate AND2 receives the control signal SEL1. A first terminal of the NOR gate NOR is coupled to an output of the AND gate AND1; a second input of the NOR gate NOR is coupled to an output of the AND gate AND2; the output of the NOR gate NOR outputs the inverted signal of the predetermined clock signal CLKA or CLKB.

When the control circuit 302 is controlled by the timing controller 301, the control signal SEL1 is just the timing control signal CS1; when the control circuit 302 is controlled by the level detecting unit 303, the control signal SEL1 is just the detecting signal DS1. When the control signal SEL1 is high, the signal received by the second input of the AND gate AND1 is the low-level control signal SEL2. Thereby, the output of the AND gate AND1 is zero; the signal received by the second input of the AND gate AND1 is the high-level control signal SEL1. Hence, the output of the AND gate AND2 is the predetermined clock signal CLKB, which is inverted by the NOR gate NOR and output. When the control signal SEL1 is low, the description above is inverted; the control circuit 302 will select to output the inverted predetermined clock signal CLKA.

According to the above description, when the control signal SEL1 is high, the control circuit 302 selects to output the inverted predetermined clock signal CLKB; when the control signal SEL1 is low, the control circuit 302 selects to output the inverted predetermined clock signal CLKA. In addition, when the control circuit 302 is used as the frequency adjusting unit 3021, the output predetermined clock signal CLKA or CLKB is used as the clock signal CLK1. When the control circuit 302 is used as the multiple selecting unit 3022, the output predetermined clock signal CLKA or CLKB is used as the multiple adjusting signal PC1.

Figure 13:
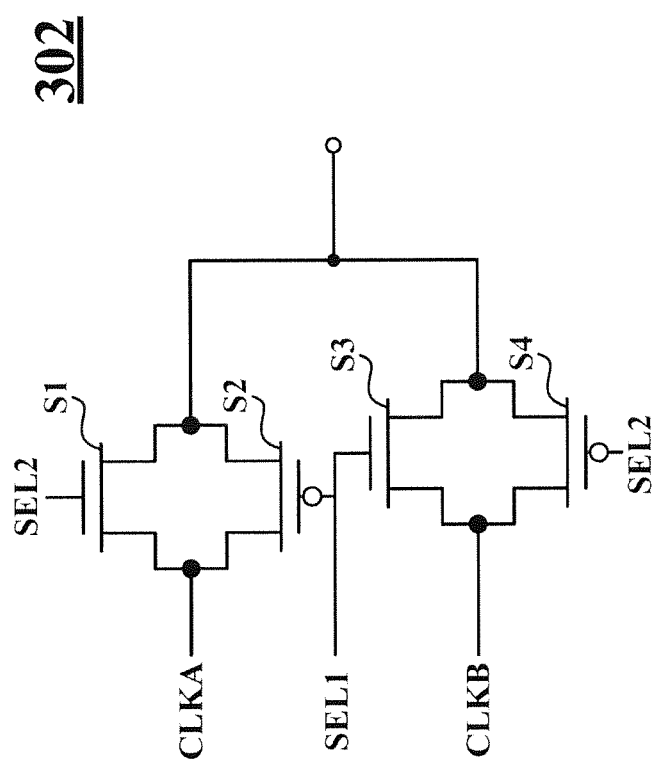
FIG. 13 shows a circuit diagram of the control circuit according to another preferred embodiment of the present invention.

Please refer to FIG. 13, which shows a circuit diagram of the control circuit according to another preferred embodiment of the present invention. Because the circuit structures of the control circuits 302, 305 according to the present invention can be identical, only the control circuits 302 will be described.

As shown in the figure, the control circuit 302 according to the present embodiment can be the frequency adjusting unit 3021 or the multiple selecting unit 3022. The control circuit 302 comprises a plurality of transistor switches S1, S2, S3, S4. An input of the transistor switch S1 is coupled to an input of the transistor S2; an output of the transistor switch S1 is coupled to an output of the transistor switch S2. Besides, a control terminal of the transistor switch S1 receives the inverted signal of the control signal SEL1 (namely, the control signal SEL2); a control terminal of the transistor switch S2 receives the control signal SEL1. An input of the transistor switch S3 is coupled to an input of the transistor S4; an output of the transistor switch S3 is coupled to an output of the transistor switch S42. Besides, a control terminal of the transistor switch S3 receives the control signal SEL1; a control terminal of the transistor switch S4 receives the control signal SEL2.

According to the present embodiment, the transistor switches S1, S3 are, but not limited to, N-type metal-oxide-semiconductor field-effect transistors (N-MOSFETs); the transistor switches S2, S4 are, but not limited to, P-type metal-oxide-semiconductor field-effect transistors (P-MOSFETs).

When the control signal SEL1 is high, the control terminal receives the control signal SEL1 and turns on the transistor switch S3; the transistor switch S4 receives the low-level control signal SEL2 and is turned on as well. Thereby, the predetermined clock signal CLKB is output. Meanwhile, the transistors S1, S2 are both turned off. On the contrary, when the control signal SEL1 is low, the description above is Inverted; the control circuit 302 will select to output the predetermined clock signal CLKA.

According to the above description, when the control signal SEL1 is high, the control circuit 302 selects to output the predetermined clock signal CLKB; when the control signal SEL1 is low, the control circuit 302 selects to output the predetermined clock signal CLKA. In addition, as the previous embodiment, when the control circuit 302 is used as the frequency adjusting unit 3021, the output predetermined clock signal CLKA or CLKB is used as the clock signal CLK1. When the control circuit 302 is used as the multiple selecting unit 3022, the output predetermined clock signal CLKA or CLKB is used as the multiple adjusting signal PC1.

Figure 14:
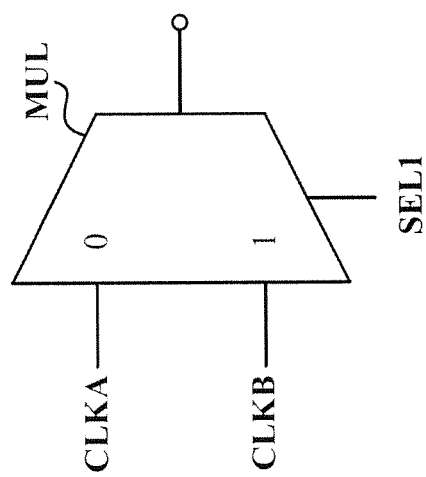
FIG. 14 shows a circuit diagram of the control circuit according to still another preferred embodiment of the present invention.

Please refer to FIG. 14, which shows a circuit diagram of the control circuit according to still another preferred embodiment of the present invention. Because the circuit structures of the control circuits 302, 305 according to the present invention can be identical, only the control circuits 302 will be described.

As shown in the figure, the control circuit 302 according to the present embodiment can be the frequency adjusting unit 3021 or the multiple selecting unit 3022. The control circuit 302 comprises a multiplexer MUL. A first input of the multiplexer MUL receives the predetermined clock signal CLKA; a second terminal of the multiplexer MUL receives the predetermined clock signal CLKB; and a control terminal of the multiplexer MUL receives the control signal SEL.

According to the present embodiment, when the control signal SEL1 is high, the multiplexer MUL selects to output the predetermined clock signal CLKB; when the control signal SEL1 is low, the multiplexer MUL selects to output the predetermined clock signal CLKA. Nonetheless, the present invention is not limited to present embodiment. Moreover, the principle of a multiplexer is well known to a person having ordinary skill in the art. Hence, the details will not be described further.

Figure 15:
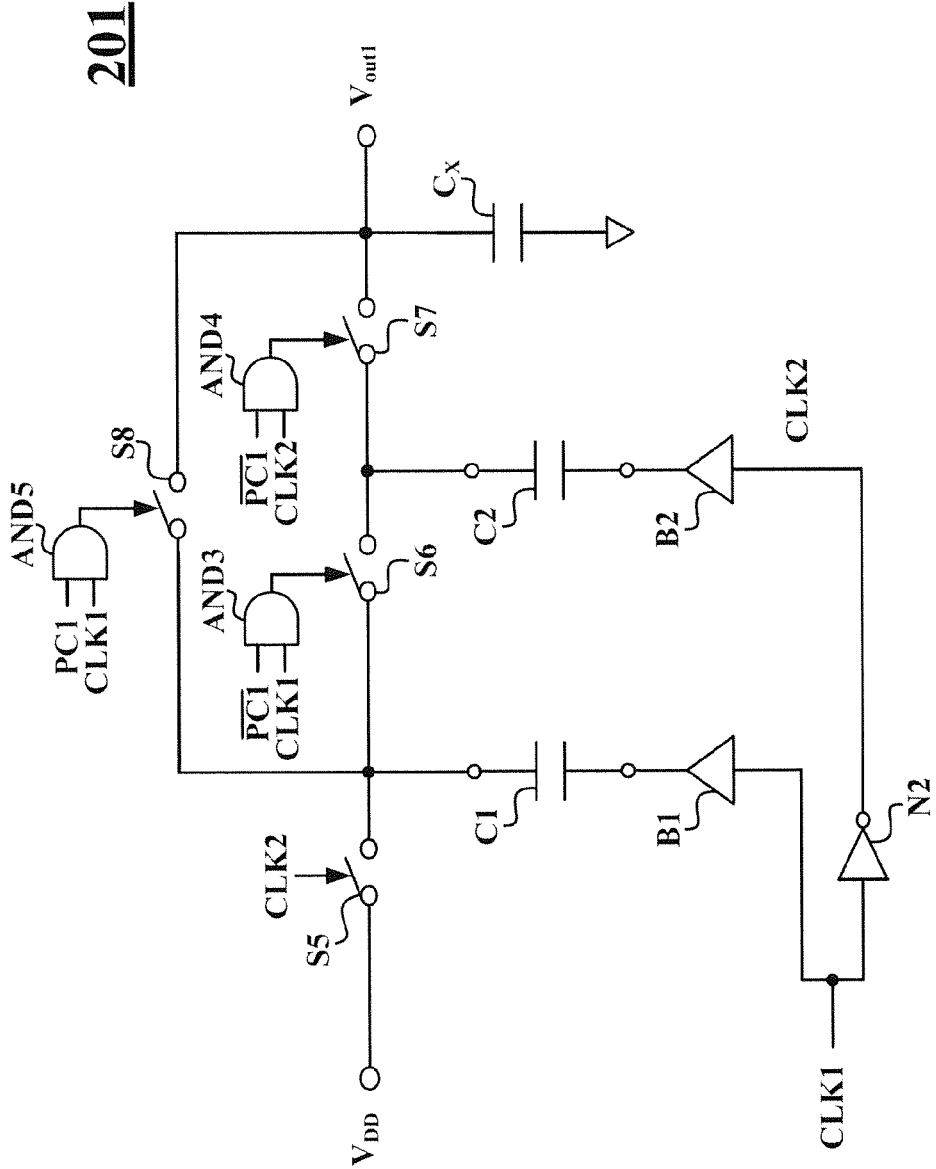
FIG. 15 shows a circuit diagram of the charge pump according to a preferred embodiment of the present invention.

Please refer to FIG. 15, which shows a circuit diagram of the charge pump according to a preferred embodiment of the present invention. Because the circuit structures of the first and second charge pumps 201, 202 according to the present invention can be identical, only the first charge pump 201 will be described.

As shown in the figure, the first charge pump 201 comprises a plurality of buffer units B1, B2, a plurality of charging capacitors C1, C2, a plurality of switches S5, S6, S7, S8, a plurality of AND gates AND1, AND2, AND3, and a voltage stabilizing capacitor $C_X$. An input of the buffer unit B1 receives the clock signal CLK1; an output of the buffer unit B1 outputs the clock signal CLK1. An input of the buffer unit B2 receives an inverted clock signal CLK2, which is the inverted signal of the clock signal CLK1; an output of the buffer unit B2 outputs the inverted clock signal CLK2. A first terminal of the charging capacitor C1 is coupled to the output of the buffer unit B1; a first terminal of the charging capacitor C2 is coupled to the output of the buffer unit B2. A first terminal of the switch S5 is coupled to the input voltage $V_{DD}$; a second terminal of the switch S5 is coupled to a second terminal of the charging capacitor C1. A first terminal of the switch S6 is coupled to the second terminal of the switch S5; a second terminal of the switch S6 is coupled to a second terminal of the charging capacitor C2. A first terminal of the switch S7 is coupled to the second terminal of the switch S6. A first terminal of the switch S8 is coupled to the second terminal of the switch S5; a second terminal of the switch S8 is coupled to the first output voltage $V_{out1}$.

Both inputs of the AND gate AND3 receive the multiple adjusting signal $\overline{PC1}$ and the clock signal CLK1, respectively, and controls the switching of the switch S6 according to the multiple adjusting signal $\overline{PC1}$ and the clock signal CLK1. Both inputs of the AND gate AND4 receive the multiple adjusting signal $\overline{PC1}$ and the inverted clock signal CLK2, respectively, and controls the switching of the switch S7 according to the multiple adjusting signal $\overline{PC1}$ and the inverted clock signal CLK2. Both inputs of the AND gate AND5 receive the multiple adjusting signal PC1 and the clock signal CLK1, respectively, ad controls the switching of the switch S8 according to the multiple adjusting signal PC1 and the clock signal CLK1. The voltage stabilizing capacitor $C_X$ is coupled to the first output voltage $V_{out1}$ and used for stabilizing and maintaining the first output voltage $V_{out1}$. According to the present embodiment, the inverted clock signal CLK2 is used for controlling the switches S5, S7. Thereby, an inverter N2 can be used for inverting the clock signal CLK1 to the inverted clock signal CLK2 before outputting to the switches S5, S7 and the buffer unit B2.

Figure 16:
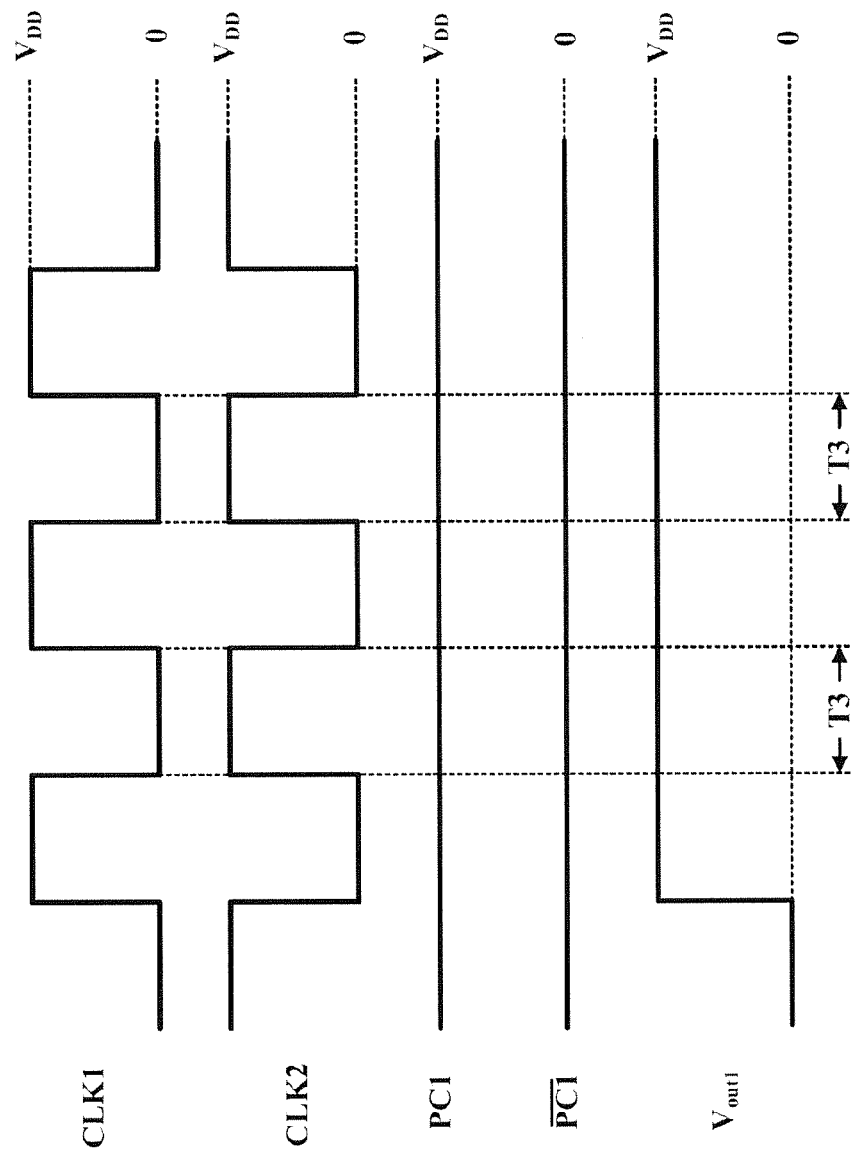
FIG. 16 shows a schematic diagram of the pulses in the charge pump according to a preferred embodiment of the present invention.

Please refer to FIG. 16, which shows a schematic diagram of the pulses in the charge pump according to a preferred embodiment of the present invention. When the clock signal CLK1 is low and the inverted clock signal CLK2 is high, and the multiple adjusting signal is set high and the multiple adjusting signal $\overline{PC1}$ is low, the switch S5 is turned on and the switches S6, S7, S8 are turned off. Then the input voltage $V_{DD}$ charges the charging capacitor C1 to the voltage level identical to the input voltage $V_{DD}$. Next, when the clock signal CLK1 is changed to high and the inverted clock signal CLK2 is changed to low, the switch S8 is turned on and the switch S5 is turned off. Then, the voltage across the charging capacitor C1 plus the voltage of the clock signal CLK1 pass through the buffer unit B1 is output directly as the first output voltage $V_{out1}$, which is thereby the twofold input voltage $V_{DD}$. In addition, because the switch S5 is turned on and the switch S8 is turned off when the clock signal CLK1 is low and the inverted clock signal CLK2 is high, the voltage across the charging capacitor C1 cannot be output to the first output voltage $V_{out1}$ via the switch S8. Thereby, in the charging time T3 of the charge pump 201, the voltage level of the first output voltage $V_{out1}$ is stabilized by the voltage stabilizing capacitor $C_X$.

According to the above description, the first charge pump 201 is controlled by the switching of the clock signal CLK1 for performing charging and discharging. Thereby, if the frequency of the clock signal CLK1 is higher, as described above, the charging speed is faster and the first output voltage $V_{out1}$ will reach the desired voltage level sooner. Accordingly, the predetermined clock signals CLKA, CLKB of the frequency selecting unit 3021 can be set to different frequencies; when fast rising is required, the predetermined clock signal having higher frequency is output as the clock signal CLK1.

Furthermore, because the multiple adjusting signal PC1 is set high in advance, the charging path includes the switches S5, S8 only. If the multiple should be adjusted for rising rapidly to the predetermined voltage level, the multiple adjusting signal PC1 can be set to low and turning off the switch S8. Then, when the clock signal CLK1 changes from low to high and inverted clock signal CLK2 changes from high to low, the charging capacitor C1 will first charge the capacitor C2 via the switch S6 to the twofold input voltage $V_{DD}$. On the other hand, when the clock signal CLK1 is low to high and inverted clock signal CLK2 is high, the voltage across the charging capacitor C2 plus the voltage of the inverted clock signal CLK2 pass through the buffer unit B2 is output directly as the first output voltage $V_{out1}$ via the switch S7. Then the first output voltage $V_{out1}$ is the threefold input voltage $V_{DD}$. Consequently, the purpose of adjusting the multiple of the first charge pump 301 can be achieved by controlling the switches S6, S7, S8 via the multiple adjusting signals PC1, $\overline{PC1}$.

Besides, the clock signal CLK1 can be further inverted and connected to the inverted clock signal CLK2. The twofold input voltage $V_{DD}$ across the charging capacitor C2 plus the twofold inverted clock signal CLK2 is output as the first output voltage $V_{out1}$, which is just the fourfold input voltage $V_{DD}$.

Figure 17:
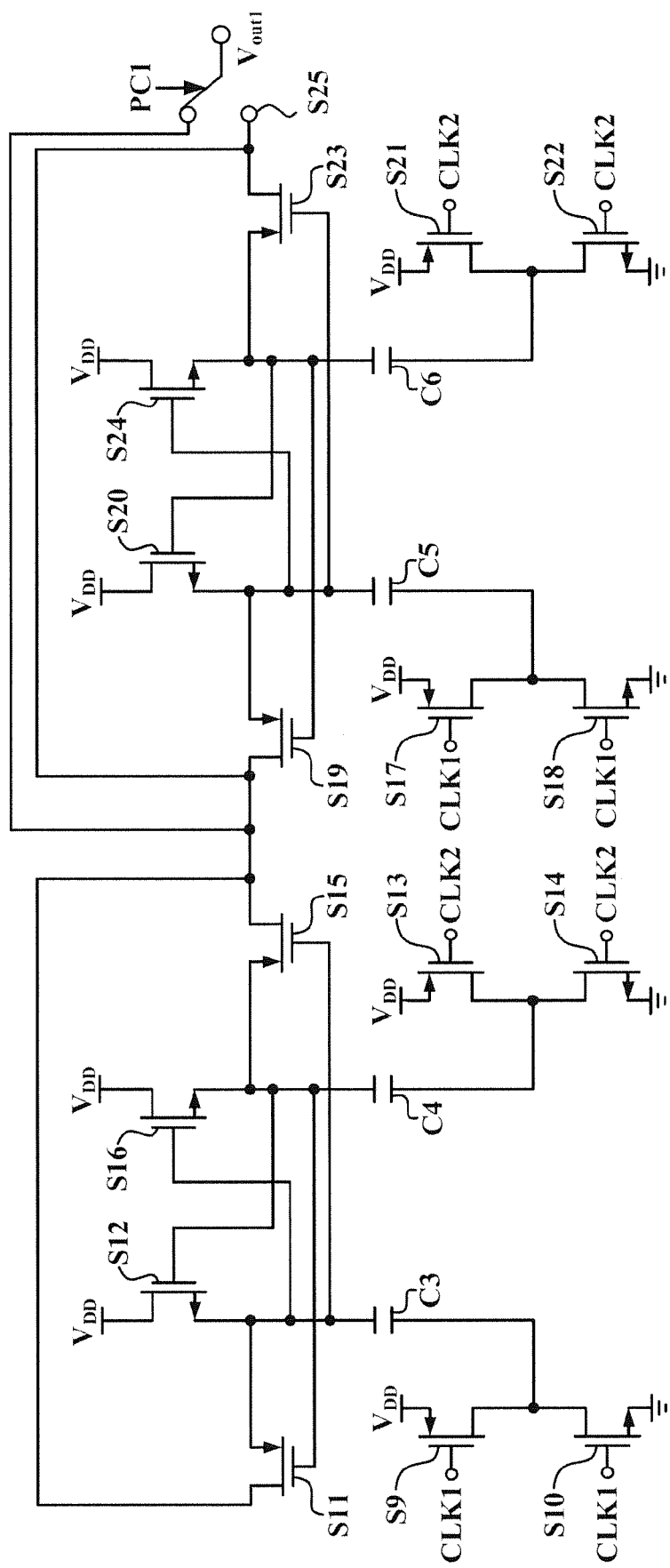
FIG. 17 shows a circuit diagram of the charge pump according to another preferred embodiment of the present invention.

Please refer to FIG. 17, which shows a circuit diagram of the charge pump according to another preferred embodiment of the present invention. Because the circuit structures of the first and second charge pumps 201, 202 according to the present invention can be identical, only the first charge pump 201 will be described.

As shown in the figure, the first charge pump 201 comprises a plurality of charging capacitors C3, C4, C5, C6, and a plurality of transistor switches S9~S24. An input of the transistor switch S9 receives the input voltage $V_{DD}$ and a control terminal thereof receives the clock signal CLK1 and is controlled by the clock signal CLK1. An input of the transistor switch S10 is coupled to an output of the transistor switch S9 and a control terminal thereof receives the clock signal CLK1 and is controlled by the clock signal CLK1. In addition, an output of the transistor switch S10 is coupled to the ground. A first terminal of the charging capacitor C3 is coupled to the input of the transistor switch S10. An input of the transistor switch S11 is coupled to a second terminal of the charging capacitor C3. An input of the transistor switch S12 receives the input voltage $V_{DD}$ and a control terminal thereof is coupled to the input of the transistor switch S11. An input of the transistor switch S13 receives the input voltage $V_{DD}$ and a control terminal thereof receives the inverted clock signal CLK2 and is controlled by the inverted clock signal CLK2. An input of the transistor switch S14 is coupled to an output of the transistor switch S13 and a control terminal thereof receives the inverted clock signal CLK2 and is controlled by the inverted clock signal CLK2. Besides, an output of the transistor switch S14 is coupled to the ground. A first terminal of the charging capacitor C4 is coupled to the input of the transistor switch S14. An input of the transistor switch S15 is coupled to a second terminal of the charging capacitor C3, a control terminal of the transistor switch S11, and a control terminal of the transistor switch S12. An output of the transistor switch S15 is coupled to an output of the transistor switch S11. An input of the transistor switch S16 receives the input voltage $V_{DD}$ and an output thereof is coupled to the input of the transistor switch S15. In addition, a control terminal of the transistor switch S16 is coupled to the input of the transistor switch S11.

An output of the transistor switch S17 is coupled to the output of the transistor switch S15. The connections of the rest transistor switches S17~S24 and the charging capacitors C5, C6, as shown in the figure, are identical to those of the transistor switches S9~S16 and the charging capacitors C3, C4. Hence, the details will not be described again.

When the clock signal CLK1 is high and the inverted clock signal CLK2 is low, the transistor switches S10, S13 are turned on and the transistor switches S9, S14 are turned off. Then the voltage of the first terminal of the charging capacitor C3 is zero. Hence, the second terminal of the charging capacitor C3 will be charged to the input voltage $V_{DD}$. The first terminal of the charging capacitor C4 is the input voltage $V_{DD}$. Thereby, the voltage of the second terminal of the charging capacitor C4 will be charged to the twofold input voltage $V_{DD}$. The voltage of the second terminal of the charging capacitor C4 will be output directly as the first output voltage $V_{out1}$ via the transistor switches S15, S25. The first output voltage $V_{out1}$ is just the twofold input voltage $V_{DD}$.

When the clock signal CLK1 is low and the inverted clock signal CLK2 is high, the transistor switches S19, S14 are turned on and the transistor switches S10, S13 are turned off. Then the voltage of the first terminal of the charging capacitor C3 is the input voltage $V_{DD}$. Hence, the second terminal of the charging capacitor C3 will be charged to the twofold input voltage $V_{DD}$. The first terminal of the charging capacitor C4 is zero. Thereby, the voltage of the second terminal of the charging capacitor C4 will be charged to the input voltage $V_{DD}$. The voltage of the second terminal of the charging capacitor C3 will be output directly as the first output voltage $V_{out1}$ via the transistor switches S11, S25. The first output voltage $V_{out1}$ is also the twofold input voltage $V_{DD}$.

According to the above description, like the previous embodiment, the first charge pump 201 is controlled by the switching of the clock signal CLK1 for performing charging and discharging. Thereby, if the frequency of the clock signal CLK1 is higher, as described above, the charging speed is faster and the first output voltage $V_{out1}$ will reach the desired voltage level sooner. Accordingly, the predetermined clock signals CLKA, CLKB of the frequency selecting unit 3021 can be set to different frequencies; when fast rising is required, the predetermined clock signal having higher frequency is output as the clock signal CLK1.

Furthermore, the switch S25 is set in advance to connect the output of the transistor switch S15 to the first output voltage $V_{out1}$. For rising to the desire voltage level rapidly by adjusting the multiple, the multiple adjusting signal PC1 controls the switch S25 to connect the output of the transistor switch S23 to the first output voltage $V_{out1}$. At this time, the output voltage of the circuit composed by the transistor switches S9~S16 and the charging capacitors C3, C4, namely, the twofold input voltage $V_{DD}$, will be boosted to the threefold input voltage $V_{DD}$ by the circuit composed by the transistor switches S17~S24 and the charging capacitors C5, C6 and output as the first output voltage $V_{out1}$ via the switch S25. In other words, the first output voltage $V_{out1}$ is the threefold input voltage $V_{DD}$. The principle is the same as the above description. Accordingly, the purpose of adjusting the multiple of the first charge pump 301 can be achieved by controlling the switch S25 via the multiple adjusting signal PC1.

To sum up, the present invention provides a power circuit having multiple stages of charge pumps. The outputs of the charge pumps in the power circuit are coupled to the voltage stabilizing capacitor for supplying the loading with a large transient current. Besides, the control circuit is coupled to the charge pumps. Then the level detecting unit is used so that the control circuit can increase the level or rise rate of the output voltage provided by the power circuit in the voltage conversion time of the scan driving signal and the scan driver can have voltages with sufficient rise rate or level. In addition, the control circuit reduces the level or rise rate of the output voltage provides by the power circuit in the voltage holding time of the scan driving signal for reducing the power consumption. Moreover, the level detecting circuit is used for detecting the output voltage of the charge pumps for controlling the switching frequency or multiple of the charge pumps. Thereby, the effects of supplying the loading with large transient currents and reducing the power consumption can be achieved according to the above methods of the present invention.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A power circuit having multiple stages of charge pumps, comprising:
   a first charge pump, producing a first output voltage according to an input voltage;
   a second charge pump, producing a second output voltage according to said first output voltage, and outputting said second output voltage for driving a loading;
   a voltage stabilizing capacitor, coupled between said first charge pump and said second charge pump, and connected externally to an output of said first charge pump; and
   an output capacitor, coupled to said second charge pump for outputting said second output voltage;
   where when said loading becomes heavy, the charges output by said voltage stabilizing capacitor increase.

2. The power circuit of claim 1, wherein said loading is a plurality of pixels of a displaying device, and when said loading becomes heavy, the charges output by said voltage stabilizing capacitor increase so that said second charge pump can output said second output voltage to a driver of said displaying device for driving said plurality of pixels.

3. The power circuit of claim 1, wherein when said loading becomes heavy, the charges output by said output capacitor increase so that said second charge pump can output said second output voltage for driving said loading.

4. The power circuit of claim 1, and further comprising:
   a timing controller, outputting a timing control signal; and
   a control circuit, outputting a clock signal or a multiple adjusting signal to said first charge pump according to said timing control signal, said clock signal determining the switching frequency of said first charge pump, said multiple adjusting signal determining the multiple of said first charge pump, and the multiple of said first charge pump being the multiple between said input voltage and said first output voltage.

5. The power circuit of claim 4, wherein said control circuit comprise:
   a frequency adjusting unit, generating said clock signal according to said timing control signal; and
   a multiple selecting unit, generating said multiple adjusting signal according to said timing control signal.

6. The power circuit of claim 4, and further comprising a level detecting unit, detecting said first output voltage, outputting a detecting signal to said control circuit according to said first output voltage, and said control circuit further outputting said clock signal or said multiple adjusting signal according said detecting signal for controlling the switching frequency or multiple of said first charge pump.

7. The power circuit of claim 6, wherein said level detecting unit has a threshold value, and when said level detecting unit judges that said first output voltage is higher than said threshold value, said level detecting unit outputs said detecting signal to make said control circuit output said clock signal for reducing the switching frequency of said first charge pump or output said multiple adjusting signal for reducing the multiple of said first charge pump.

8. The power circuit of claim 6, wherein said level detecting unit has a threshold value, and when said level detecting unit judges that said first output voltage is lower than said threshold value, said level detecting unit outputs said detecting signal to make said control circuit output said clock signal for increasing the switching frequency of said first charge pump or output said multiple adjusting signal for increasing the multiple of said first charge pump.

9. The power circuit of claim 1, and further comprising:
   a timing controller, outputting a timing control signal; and
   a control circuit, outputting a clock signal or a multiple adjusting signal to said second charge pump according to said timing control signal, said clock signal determining the switching frequency of said second charge pump, said multiple adjusting signal determining the multiple of said second charge pump, and the multiple of said second charge pump being the multiple between said first output voltage and said second output voltage.

10. The power circuit of claim 9, wherein said control circuit comprise:
- a frequency adjusting unit, generating said clock signal according to said timing control signal; and
- a multiple selecting unit, generating said multiple adjusting signal according to said timing control signal.

11. The power circuit of claim 9, and further comprising a level detecting unit, detecting said second output voltage, outputting a detecting signal to said control circuit according to second first output voltage, and said control circuit further outputting said clock signal or said multiple adjusting signal according said detecting signal for controlling the switching frequency or multiple of said second charge pump.

* * * * *